United States Patent Office 3,597,492
Patented Aug. 3, 1971

3,597,492
PROCESS FOR CONVERTING TOLUENE TO
BENZENE AND XYLENE
Seiya Otani, Takao Iwamura, Shotaro Hayashi, Daisuke Ogawa, and Masazumi Kanaoka, Ohtsu-shi, Japan, assignors to Toyo Rayon Kabushiki Kaisha, Chuo-ku, Tokyo, Japan
Filed Apr. 21, 1969, Ser. No. 817,802
Claims priority, application Japan, Apr. 27, 1968,
43/28,232
Int. Cl. C07c *3/00, 3/58, 15/08*
U.S. Cl. 260—672
4 Claims

ABSTRACT OF THE DISCLOSURE

Process for preparing benzene and xylene from toluene, which comprises carrying out disproportionation (A) and demethylation (B) of toluene in parallel while recycling a part of hydrocarbons of not less than 9 carbon atoms separated and recovered from products of said reactions (A) and (B), to reaction step (A) and/or reaction step (B).

---

Figure 1:
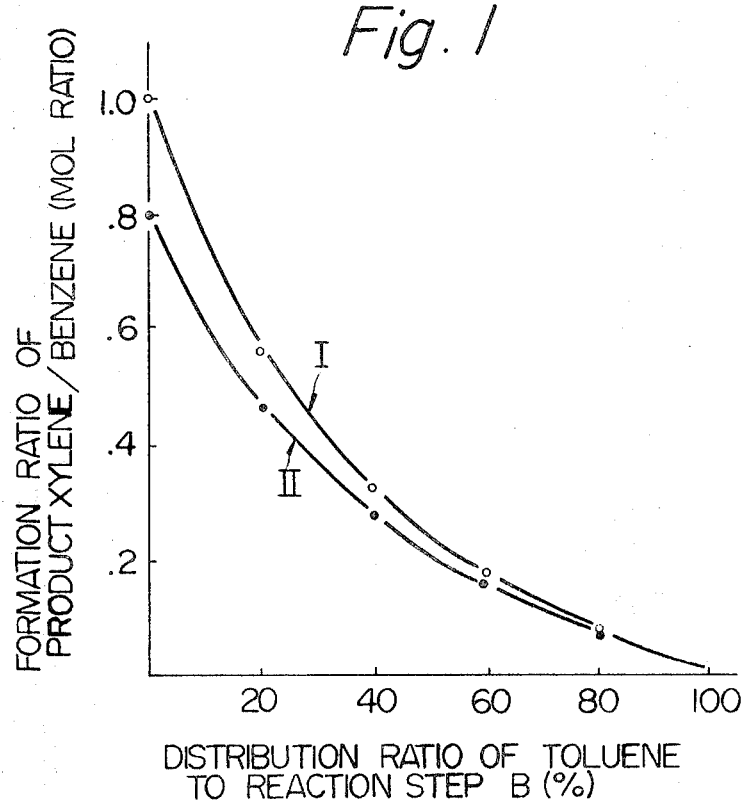

This invention relates to a process for converting toluene to benzene and xylene.

Importance of benzene and xylene as the materials for synthetic resins and fibers has been rapidly increasing in recent years, and consequently various attempts are made to convert toluene of relatively less utility to benzene and xylene by disproportionation or dealkylation process. Such disproportionation or dealkylation of toluene is conveniently achieved by contacting toluene with solid acid catalyst normally at high temperatures and in vapor phase. U.S. Pats. Nos. 2,795,629 and 3,281,483, etc., for example, disclose processes of above-described category. However, those known processes are invariably subject to one or more of the defects such as formation and accumulation of undesirable side products, commercially unsatisfactory yield of benzene and/or xylene, low purity of object products, etc. That is, dealkylation of toluene produces benzene, and disproportionation of toluene produces benzene and xylene as the object products, but the reaction products of both processes contain large numbers of side products besides the object products and unreacted toluene. Examples of such side products include paraffins such as methane, ethane, propane, butane, pentane, hexane, heptane, etc.; cycloparaffins such as cyclopentane, methylcyclopentane, methylcyclohexane, etc.; alkylbenzenes having nine carbons such as trimethylbenzene isomers, methylethylbenzene isomers, propylbenzene isomers, etc.; alkylbenzenes having no less than ten carbons; and aromatic polycyclic compounds such as naphthalene, anthracene, and derivatives thereof, biphenyl, triphenyl, and derivatives thereof, etc. The total of such side products per one pass through the reaction system amounts to as high as 5–10% by weight, and thus not only remarkably reduces the total yield but also lowers the purity of object products.

We have been engaged zealously in the search for a process of toluene conversion to benzene and xylene, wherein benzene and xylene are obtained with high yields and satisfactory purity, and now completed a novel process as described hereinbelow.

This invention provides a process for converting toluene to benzene and xylene, which consists of:

(1) A reaction step A wherein disproportionation of toluene is effected by contacting toluene with a solid acid catalyst in the presence of hydrogen gas, at elevated temperature and pressure;

(2) A reaction step B performed in parallel with the above step A, wherein toluene is subjected to dealklyation reaction in the presence of hydrogen, at elevated temperature and pressure;

(3) A step for separating low boiling point hydrocarbons from the reaction products of the above steps A and B; and (4) A step wherein the fractions of distillate having no less than nine carbons are further separated from the reaction products in the second stage separation and purification, benzene and xylene are recovered separately, and at least a portion of the separated fractions of distillate having no less than nine carbons is recycled into at least one of the above reaction steps A and B.

Hereinafter the process of this invention will be explained with reference to be attached drawings.

Figure 2:
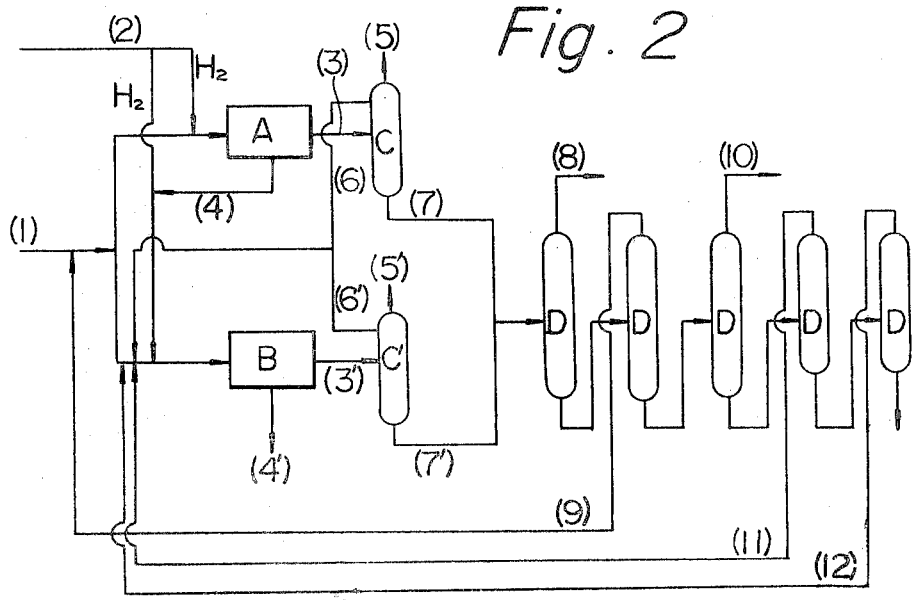

FIG. 1 shows a curve indicating the correlation of feed ratio of starting toluene to the reaction steps A and B versus mol ratio of xylene and benzene obtained as the reaction products in accordance with the present invention; and FIG. 2 is a flow sheet showing one embodiment of the subject process.

The reaction step A performed in the subject process is known per se as disproportionation of toluene. That is, in that step toluene is contacted with a solid acid catalyst in hydrogen atmosphere, at elevated temperature and pressure, to produce benzene and xylene. The reaction temperature normally ranges from 300° C. to 700° C., preferably from 350° C. to 550° C., and the pressure, normally from atmospheric to 100 kg./cm.$^2$, preferably from 10 to 40 kg./cm.$^2$. The weight hourly space velocity (hereinafter abbreviated as WHSV) ranges 0.1–10 hr.$^{-1}$, preferably 0.3–3 hr.$^{-1}$. The mol ratio of hydrogen gas/toluene feed is normally 1–50, preferably 5–25. Conventionally employed solid acid catalysts in the disproportionation of toluene, such as crystalline alumino-silicate, silica-alumina, boria-alumina, alumina-aluminium flouride, etc., can be used in this step A.

The reaction B to be performed in parallel with the step A is known per se, in which toluene is demethylated in the presence of hydrogen at elevated temperature and pressure to produce benzene. The reaction temperature normally ranges from 500 to 1,000° C., preferably 650–750° C., and the reaction pressure, from atmospheric to 100 kg./cm.$^2$, preferably 20–60 kg./cm.$^2$. The mol ratio of hydrogen gas/toluene feed ranges from 0.5 to 20, preferably from 2–10. In this reaction presence of catalyst is not essential, but solid acid catalyst may be used. For example, solid acid catalysts conventionally employed for ordinary dealkylation, such as oxides of Group VI metals in the Periodic Table such as molybdenum oxide and chromium oxide as carried on alumina carriers etc.; or noble metal catalysts such as platinum, palladium, etc. carried on alumina carriers etc., may be employed. When a catalyst is used, normally WHSV ranges 0.2–20 hr.$^{-1}$, preferably 0.5–10 hr.$^{-1}$. In the absence of catalyst, the reaction time normally ranges 1–60 seconds, preferably 2–60 seconds.

One of the characteristic features of this invention is the parallel arrangement of above reaction steps A and B, whereby the feed ratio of starting toluene to the two steps can be suitably selected. Suitable feed ratio to the steps A and B is within the range of 1:10 to 10:1.

According to the subject process, it is required that the low boiling point side products should be removed from the reaction products of steps A and B, in the immediately following separation step. Preferably the low boiling point hydrocarbons to be removed in this separation step are those boiling at approximately 55° C. or below under atmospheric pressure, because of the necessity to reduce the accompanying loss in benzene, xylene, and unreacted toluene. Such low boiling point hydrocarbons can be almost completely eliminated by this separation step. The removal may be separately conducted in the downstream of the steps A and B, or the reaction products of the two steps may be combined and together subjected to the separation step as a single system. The operational conditions of this step can be optionally selected, so far as they allow the separation of hydrocarbons boiling at temperatures not higher than approximately 55° C. at atmospheric pressure. This step is normally effected in a stabilizer. The pressure condition in the stabilizer is not critical, but preferably ranges from atmospheric to the reaction pressure employed. The reflux ratio is normally 5–20. The construction of stabilizer neither is critical, but normally it contains 20–40 plates.

Thus the low boiling point components are removed from the reaction product, and the remaining liquid component is recovered from a lower portion of the stabilizer. The liquid component is further distilled in the second separation and purification step, and whereupon the object products can be separately obtained. During this separation of the object products, such side products as alkylbenzenes of no less than 9 carbon atoms such as trimethylbenzene isomers, methylethylbenzene isomers, propylbenzene isomers, etc., and aromatic polycyclic hydrocarbons such as naphthalene, anthracene, phenanthrene, biphenyl, triphenyl, and their derivatives, etc. (hereinafter these side products will be collectively referred to as "the fractions of distillate having not less than 9 carbon atoms," in this specification and in the appended claims) are also separated. Normally the alkylbenzenes containing no less than 9 carbons are formed in larger amount in the disproportionation of reaction step A, than in the dealkylation of step B. Whereas, the aromatic polycyclic hydrocarbons containing no less than 9 carbons are discovered to be formed mainly by the dealkylation reaction of step B.

The most significant characteristics of the invention is the recycling of at least a portion of thus obtained fractions of distillate having no less than 9 carbons to the above reaction steps A and/or B. Upon recycling of such fractions, formation of side products is inhibited in the reaction step A, and benzene and xylene yields are increased. Similarly in the reaction step B, recycling of such fractions is effective to reduce the formation of side products, consequently increasing the benzene yield. Thus, by recycling the fractions of distillate having no less than 9 carbons to the reaction steps A and/or B, yields of benzene and xylene which are the object products can be increased, and simultaneously the products' purity can be improved. Furthermore, accumulation of side products can be remarkably reduced. The amount of the fractions to be recycled to the reaction step A normally ranges 0.1–20 mol percent, preferably 0.5–8 mol percent, based on the toluene fed to the step A. Also as to the recycling to step B, the suitable amount normally ranges 0.1–30 mol percent, preferably 0.5–10 mol percent, based on the toluene fed to the reaction step B. In one of the preferred embodiments for recycling the fractions of distillate having not less than 9 carbons to the steps A and B, alkylbenzenes of not less than 9 carbons are recycled to the step A, and the aromatic polycyclic hydrocarbons such as biphenyl, anthracene, etc., to the step B. Whereby the object of this invention is better achieved. In such a preferred embodiment, it is desirable that the amount of aromatic polycyclic hydrocarbons to be recycled to the step B should range 0.1–10 mol percent, based on the amount of toluene fed to the step B.

An example of the correlation of toluene feed ratio to the steps A and B versus the mol ratio of xylene to benzene obtained as the object products in accordance with the subject process is illustrated in FIG. 1. The correlation shown in FIG. 1 is obtained when trimethylbenzenes which are formed mainly in the reaction step A are recycled to the step A or B, as the side products having not less than 9 carbons.

Referring to FIG. 1, the curve I is obtained when all of said side products are recycled to the reaction step A alone, and the curve II shows the case in which the side products are recycled to the step B alone. In both cases the amount of recycled side products correspond to approximately 3 mol percent of the toluene fed to the reaction step A. The reaction is performed in the manner described in later-given Example 1. As is clear from FIG. 1, by suitably controlling the quatitative ratio of toluene supply to the steps A and B, the production ratio of benzene to xylene can be controlled to the desired value in accordance with the respective demands. Furthermore, it can be understood from FIG. 1 that the production ratio of the two can be varied also by changing the distribution ratio of the fractions of distillate having not less than 9 carbons to the reaction steps A and B.

If preparation of particularly high purity benzene is required in the subject process, during the separation step of the low boiling point hydrocarbons, a liquid composed mainly of benzene may be withdrawn as a side flow, and recycled to the reaction steps A and/or B. Furthermore, it is also possible to supply the hydrogen gas discharged from the reaction step A to step B, whereby utilizing the hydrogen gas more effectively.

According to the novel process of this invention, benzene and xylene can be produced at higher yields than those in conventional processes, and accumulation of side products inherent in the conventional processes can be remarkably reduced. Consequently, the products benzene and xylene have very high purities. Furthermore, the production ratio of benzene to xylene can be optionally controlled in accordance with the fluctuations in demands. Thus the advantages of the subject process are many and great.

Hereinafter the invention will be further explained with reference to working examples.

CONTROL

Experiment A

Toluene disproportionation reaction was conducted using mordenite catalyst. The reaction conditions and results were as indicated below:

Reaction temperature (° C.) _____ 400
Reaction pressure (atm.) _____ 30
WHSV (hr.$^{-1}$) _____ 0.5
Hydrogen/toluene (mol ratio) _____ 8
Conversion [1] (mol percent) _____ 42
Overall yield [2] (mol percent) _____ 90.5

$$^1 \text{Converson} = \frac{\text{(moles of benzene and xylene formed)}}{\text{(moles of toluene supplied)}} \times 100$$

$$^2 \text{Overall yield} = \frac{\text{(moles of benzene and xylene formed)}}{\text{(moles of consumed toluene)}} \times 100$$

Analysis of product benzene:
    Purity (mol percent) _____ 99.93
    n-Paraffins (mol p.p.m.) _____ 92
    iso-Paraffins (mol p.p.m.) _____ 76
    Cycloparaffins (mol p.p.m.) _____ 308
    Toluene (mol p.p.m.) _____ 220

Experiment B

Demethylation of toluene was conducted without catalyst. The conditions and results were as shown below:

Reaction temperature (° C.) _____ 650
Reaction pressure (atm.) _____ 40
Reaction time (sec.) _____ 30
Hydrogen/toluene (mol ratio) _____ 4
Conversion (mol percent) _____ 80
Overall yield (mol percent) _____ 93

Analysis of product benzene:
- Purity (mol percent) _____ 99.93
- n-Paraffins (mol p.p.m.) _____ 106
- iso-Paraffins (mol p.p.m.) _____ 100
- Cycloparaffins (mol p.p.m.) _____ 204
- Toluene (mol p.p.m.) _____ 250

In this experiment, the definitions of conversion and overall yield are same to the above.

EXAMPLE 1

One embodiment of the subject process as illustrated by the flow sheet of FIG. 2 was practiced as follows.

As the starting toluene, fresh toluene supply 1 and circulating toluene 9 were combined and divided into two equimolar portions to be supplied to the reaction steps A and B. The reaction control conditions in the two steps were the same as in those of Experiments A and B, respectively.

Conditions of reaction step A (Catalyst: mordenite):
- Reaction temperature (° C.) _____ 400
- Reaction pressure (atm.) _____ 30
- WHSV (hr.$^{-1}$) _____ 0.5
- Hydrogen/toluene (mol ratio) _____ 8

Conditions of reaction step B (No catalyst employed):
- Reaction temperature (° C.) _____ 650
- Reaction pressure (atm.) _____ 40
- Reaction time (sec.) _____ 30
- Hydrogen/toluene (mol ratio) _____ 4

The liquid 3 discharged from step A was sent to a stabilizer C (botton temperature: 180° C., bottom pressure: 4 kg./cm.$^2$) and removed of the low boiling point hydrocarbons 5 which was composed mainly of methane, ethane, propane and butane. From the stabilizer C, a side flow 6 containing 93 wt. percent of benzene and minor amounts of paraffins and cycloparaffins of 1-7 carbons was withdrawn in the amount of 0.5 wt. percent to the liquid supply to the stabilizer.

The discharge liquid 3' from the reaction step B was sent to another stabilizer C' (bottom temperature: 220° C., bottom pressure: 15 kg./cm.$^2$), and removed of the low boiling component which was composed mainly of methane, ethane, and propane. Simultaneously 1.2 wt. percent based on the liquid supply to the stabilizer C' of a side flow 6' containing 91 wt. percent of benzene and minor amounts of paraffins and cycloparaffins of 1-7 carbons was withdrawn.

The above two side flows were combined and recycled to the reaction step B. The bottoms 7 and 7' of the stabilizers C and C' were combined and subjected to the second separation and purification step D which consisted of five distillation columns. From the first column, benzene 8 was recovered as distillate from the column top; from the second column, toluene 9 was recovered; from the third, xylene 10; from the fourth, trimethylbenzenes 11, and from the fifth, biphenyl 12 was similarly recovered. Among the fractions of distillate thus recovered, toluene 9 was combined with the fresh toluene supply 1 to be recycled to the reaction steps. The trimethylbenzenes 11 corresponding to 3 mol percent of the toluene supply to the step A, and the biphenyl 12 corresponding to 4 mol percent of the toluene supply to the step B, were both recycled to the step B. Separately, hydrogen 2 of 90% concentration was supplied to the reaction steps A and B, and the off-gas 4 from the step A (hydrogen concentration: 80%) was combined with said hydrogen gas supply to the step B. The off-gas 4' from the reaction step B had a hydrogen concentration of 51%.

To 100 mols of the fresh toluene consumed, 78.7 mols of benzene and 19.4 mols of xylene were obtained. The overall yield thus reached 98.1 mol percent. The respective conversions in the steps A and B were 42 mol percent and 84 mol percent.

The above result demonstrates that the material loss is markedly reduced in the subject process, compared with the Control in which the reaction steps A and B were each independently conducted.

Also the analysis values of benzene obtained in the above-described embodiment were as follows, which again clearly demonstrate that the product is qualitatively much superior to the benzene obtained in the Control.

Analysis of benzene:
- Purity (mol percent) _____ 99.96
- n-Paraffins (mol p.p.m.) _____ 15
- i-Paraffins (mol p.p.m.) _____ 18
- Cycloparaffins (mol p.p.m.) _____ 150
- Toluene (mol p.p.m.) _____ 210

EXAMPLE 2

The starting toluene was distributed to the reaction steps A and B at a ratio of 65:35. The reaction conditions in each step were as follows:

Reaction step A (catalyst: mordenite-aluminium fluoride):
- Temperature (°C.) _____ 430
- Pressure (kg./cm.$^2$) _____ 20
- WHSV (hr.$^{-1}$) _____ 0.8
- Hydrogen/toluene mol ratio _____ 10

Reaction step B (catalyst: Cr$_2$O$_3$-containing dealkylation catalyst):
- Temperature (°C.) _____ 600
- Pressure (kg./cm.$^2$) _____ 45
- WHSV (hr.$^{-1}$) _____ 1.5
- Hydrogen/toulene mol ratio _____ 5

Hydrogen gas of 95% concentration was supplied to the two reaction steps, and the off-gas of 78% hydrogen concentration from the step A was additionally supplied to the step B.

The off-gas discharged from the reaction step B had a hydrogen concentration of 40%. The liquid products from the two reaction steps were combined and supplied to a stabilizer (bottom temperature: 200° C., bottom pressure: 7 kg./cm$^2$) to be removed of the low boiling point hydrocarbons. Thus separated hydrocarbons were composed mainly of methane, ethane, propane and butane. Simultanuously, 0.8 wt. percent of the total liquid supply to the stabilizer of a side flow containing 96 wt. percent of benzene and minor amounts of paraffins and cycloparaffins of 1-7 carbons was withdrawn and recycled to the reaction step A.

The bottom from the stabilizer was treated with clay, and sent to the second separation and purification step. Said purification step was effected by four distillation columns, and from each of the column tops, benzene, toluene; mixture of m-xylene, p-xylene, and ethylbenzene; and o-xylene were recovered, respectively. At the fourth column, hydrocarbons composed mainly of trimethylbenzene, corresponding to 4% to the liquid supply to said fourth column, was withdrawn as a side flow from the space between the supply plate and column bottom, and recycled to the reaction step A. Furthermore, the bottom from the fourth column, which consisted mainly of biphenyl, was recycled to the reaction step B. The results of this run were as follows:

To 100 mols of fresh toluene consumption:
- Benzene formed (mols) _____ 62.0
- Xylene formed (containing ortho-xylene) (mols) _____ 36.1
- Overall yield (mol percent) _____ 98.1

The respective conversions in the steps A and B were 41 mol percent and 82 mol percent.

The quality test results of the above benzene were as follows:

| | |
|---|---|
| Purity (mol percent) | 99.96 |
| n-Paraffins (mol p.p.m.) | 25 |
| i-Paraffins (mol p.p.m.) | 18 |
| Cycloparaffins (mol p.p.m.) | 200 |
| Toluene (mol p.p.m.) | 180 |

The analytical results of the xylene mixture from which most of the ortho-xylene was separated were as follows:

| | Percent (by weight) |
|---|---|
| Purity (total sum of m-, and p-xylene, ethylbenzene, and remaining o-xylene) | 99.5 |
| Paraffins | 0.02 |

EXAMPLE 3

Fresh toluene supply and recirculated toluene were combined, and 40% thereof was supplied to the reaction step A, and the remaining 60%, to the reaction step B. The reaction conditions of the steps A and B were as follows:

Reaction step A (catalyst: mordenite):

| | |
|---|---|
| Temperature (°C.) | 420 |
| Pressure (kg./cm.$^2$g.) | 30 |
| WHSV (hr.$^{-1}$) | 1.0 |
| Hydrogen/toluene mol ratio | 7 |

Reaction step B (no catalyst):

| | |
|---|---|
| Temperature (°C.) | 700 |
| Pressure (kg./cm.$^2$g.) | 40 |
| Reaction time (sec.) | 25 |
| Hydrogen/toluene mol ratio | 5 |

The discharge liquid from the reaction step A was passed through a stabilizer to be removed of low boiling point hydrocarbons. The discharge liquid from the step B was also sent to a stabilizer to be removed of low boiling point hydrocarbons, and the bottoms of two stabilizers were combined and fed to the second stage separation and purification step which was effected with five distillation columns. From the column tops, benzene, toluene, xylene, trimethylbenzene, and biphenyls were recovered respectively. The trimethylbenzenes were entirely recycled to the reaction step A, and also the entire biphenyls were recycled to the step B. Hydrogen of 92% concentration was supplied to both steps A and B, and the off-gas of step A (hydrogen concentration: 80%) was supplied to the step B. The hydrogen concentration in the off-gas from the step B was 55%.

The reaction results were as follows:

| Conversion: | Mol percent |
|---|---|
| Step A | 40 |
| Step B | 82 |
| Overall yield | 97.8 |

Analysis results of benzene:

| | |
|---|---|
| Purity (mol percent) | 99.96 |
| n-Paraffins (mol p.p.m.) | 18 |
| i-Paraffins (mol p.p.m.) | 23 |
| Cycloparaffins (mol p.p.m.) | 130 |
| Toluene (mol p.p.m.) | 205 |

What is claimed is:
1. A process for converting toluene to benzene and xylene which comprises:
   (1) dividing a toluene feed into two portions;
   (2) contacting one of said toluene portions with a solid acid catalyst in the presence of hydrogen gas and at an elevated temperature and pressure whereby disproportionation of said toluene is effected;
   (3) subjecting the other of said toluene portions to a dealkylation reaction in parallel with step 2 in the presence of the hydrogen effluent from step 2 and at an elevated temperature and pressure;
   (4) separating from the reaction products of steps 2 and 3 a liquid comprised mainly of benzene and containing benzene azeotropes in a first stage separation;
   (5) recycling the combined separated liquid from step 4 to step 2, step 3, or both steps 2 and 3;
   (6) combining the products from step 4 free of said liquid composed mainly of benzene and separating said products in a second stage separation into a fraction containing not less than nine carbon atoms and separate xylene and benzene fractions; and
   (7) recycling at least a portion of said fraction containing not less than nine carbon atoms from step 6 to step 2, step 3, or both steps 2 and 3.

2. The process of claim 1, in which the alkylbenzenes of not less than nine carbons among the fractions of distillate containing at least nine carbons are recycled to the step 2, and aromatic polycyclic hydrocarbons are recycled to the step 3.

3. The process of claim 1, in which the feed ratio of toluene to the reaction steps 2 and 3 is within the range of 1:10 to 10:1.

4. The process of claim 1, in which the amount of the fractions of distillate containing not less than nine carbons to be recycled to the reaction step 2 ranges 0.1–20 mol percent based on the toluene supply to the step 2, and that of the fractions to be recycled to the step 3 ranges 0.1–30 mol percent, based on the toluene supply to the step 3.

References Cited
UNITED STATES PATENTS

| | | | |
|---|---|---|---|
| 2,795,629 | 5/1957 | Boedeker | 260—668 |
| 3,281,483 | 10/1966 | Benesi et al. | 260—672 |
| 3,287,431 | 11/1966 | Fiegelman | 260—672 |
| 3,437,710 | 4/1969 | Pollitzer | 260—672 |
| 3,476,821 | 11/1969 | Brandenburg et al. | 260—672 |
| 3,529,031 | 9/1970 | Otani et al. | 260—672 |

DELBERT E. GANTZ, Primary Examiner

G. E. SCHMITKONS, Assistant Examiner

U.S. Cl. X.R.

260—668A, 672NC, 672T, 674R, 672H